United States Patent
Panzer et al.

(10) Patent No.: US 7,854,162 B2
(45) Date of Patent: Dec. 21, 2010

(54) METHOD AND DEVICE FOR REFERENCING THE POSITION OF AN ACTUATING ELEMENT

(75) Inventors: Matthias Panzer, Buehl (DE); Markus Baehr, Achern (DE); Juergen Eich, Buehl (DE); Alexander Renfer, Buehl (DE); Joachim Hirt, Oberkirch (DE); Thomas Weber, Muggensturm (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 12/228,810

(22) Filed: Aug. 15, 2008

(65) Prior Publication Data

US 2009/0064774 A1 Mar. 12, 2009

Related U.S. Application Data

(63) Continuation of application No. PCT/DE2007/000124, filed on Jan. 25, 2007.

(30) Foreign Application Priority Data

Feb. 16, 2006 (DE) ........................ 10 2006 007 124

(51) Int. Cl.
*G01M 13/02* (2006.01)
(52) U.S. Cl. .................................................. 73/115.04
(58) Field of Classification Search .............. 73/115.01, 73/115.02, 115.03, 115.04
See application file for complete search history.

(56) References Cited

U.S. PATENT DOCUMENTS

| 5,161,405 | A | * | 11/1992 | Macqueene | 701/3 |
| 5,678,673 | A | | 10/1997 | Borschert et al. | |
| 6,094,976 | A | * | 8/2000 | Hayashi et al. | 73/115.04 |
| 6,510,931 | B2 | | 1/2003 | Berger et al. | |
| 7,555,942 | B2 | * | 7/2009 | Baehr et al. | 73/115.04 |
| 7,574,296 | B2 | * | 8/2009 | Baehr et al. | 701/67 |
| 2002/0035015 | A1 | | 3/2002 | Eich et al. | |
| 2006/0009328 | A1 | | 1/2006 | Jung et al. | |
| 2007/0209901 | A1 | * | 9/2007 | Ehrlich et al. | 192/84.6 |
| 2007/0267268 | A1 | * | 11/2007 | Baehr et al. | 192/84.6 |
| 2008/0215221 | A1 | * | 9/2008 | Baehr et al. | 701/68 |
| 2008/0305931 | A1 | * | 12/2008 | Eich et al. | 477/174 |

FOREIGN PATENT DOCUMENTS

| DE | 44 33 825 A1 | 4/1996 |
| DE | 100 27 330 A1 | 12/2000 |
| EP | 1 614 922 A2 | 1/2006 |
| GB | 2 369 869 A | 6/2002 |

\* cited by examiner

*Primary Examiner*—Eric S McCall
(74) *Attorney, Agent, or Firm*—Davidson, Davidson & Kappel, LLC

(57) ABSTRACT

In a method for referencing the position of an actuating element of a functional unit, in particular of a clutch in the drivetrain of a vehicle, the attainment of a reference position of the actuating element is assessed for plausibility in that it is checked whether a variable which can be applied to the actuating element varies in a predetermined way in a predetermined spacing of the position of the actuating element from the reference position.

15 Claims, 4 Drawing Sheets

METHOD AND DEVICE FOR REFERENCING THE POSITION OF AN ACTUATING ELEMENT

This application is a continuation of prior International Application PCT/DE2007/000124, filed Jan. 25, 2007, which is hereby incorporated by reference herein.

The invention relates to a method and device for referencing the position of an actuating element of a functional unit, especially a clutch in the drivetrain of a motor vehicle.

BACKGROUND

In the motorized actuation of functional units using an actuating element in which the function of the functional unit changes, e.g., in proportion to the position of the actuating element, it is frequently necessary to reference the position of the actuating element so that the precise position of the actuating element is known in a control unit. An example of this is the motorized actuation of a clutch in which the position of a clutch lever determines the torque transferability of the clutch. A precise knowledge of the torque transferability of the clutch is important to precisely control or regulate starting and shifting.

Referencing is especially essential when for example an electric motor is used as the actuator that drives the actuating element via a shaft whose rotary position is detected with an incremental sensor. The incremental sensor cannot detect absolute positions of the actuating element, but merely changes in position so that it is necessary to determine the absolute position of the actuating element or the rotary position of the output shaft of the electric motor by means of referencing.

A control element for a motor vehicle friction clutch is known from DE 44 33 825 C2 in which the output shaft of an electric motor drives a segment gear on which an actuating element for the clutch is mounted. The rotational range of the segment gear is limited by stops that can be approached for referencing. In this manner, the actuating element's absolute position can be determined from which the displacement path can be detected by means of an incremental sensor.

A device for shifting a gear is known from DE 100 27 330 A1 in which an electric motor whose rotary position is detected by means of an incremental sensor drives an actuating element of the transmission that can be moved into an end position against a stop. The actuating element is additionally equipped with a surface profile that engages with a spring-loaded pickup component. The profile of the actuating element is such that the force required to displace the actuating element depends on the relative position between the surface profile and the pickup component. The slope of shape surfaces of the profile can be such that the force applied by the elastic pretension of the pickup component on the actuating element is greater in sections than the holding torque of the electric motor so that one can determine if the actuating element is within a predetermined control range when a small voltage is applied to the electric motor.

With referencing that uses stops and thereby recognizes that the actuating element does not move despite the force exerted by the actuator on the actuating element, there is a danger of incorrectly identifying a blockage as a reference position in a transmission path in which the actuating element is located. Particularly when actuating clutches, this can cause hazardous operating conditions since the vehicle may for example unintentionally drive away.

SUMMARY OF THE INVENTION

An object of the present invention provides an method and device for increasing the safety of referencing the position of an actuating element of a functional unit.

An embodiment of the present invention provides a method for referencing the position of an actuating element of a functional unit, especially a clutch in the drivetrain of a motor vehicle in which the attainment of a reference position of the actuating element is assessed for plausibility by checking whether a variable applicable to the actuating element changes in a predetermined manner when the actuating element is at a specific distance from the reference position.

The variable applicable to the actuating element may be advantageously the actuation force required to position the actuating element.

Alternatively, the variable applicable to the actuating element can be the speed of the actuating element that exists when a constant actuation force is applied by the actuating element.

In one embodiment of the method according to the invention in which the variable applicable to the actuating element may be changed in a predetermined manner when a plausibility position is reached, the variable may be determined when the actuating element moves before and/or after the plausibility position is reached, a mutual relationship may be established for the determined variables, and the plausibility position may be evaluated when the mutual relationship meets specific criteria. In the above-cited embodiment of the method according to the invention, the plausibility position itself may also be evaluated for plausibility to increase the overall reliability of the referencing.

Another embodiment according to the invention provides a device for referencing the position of an actuating element of a functional unit, especially a clutch in the drivetrain of a motor vehicle, and the device has an actuator to adjust an actuating element, an incremental sensor that detects the change of the position of the actuating element, a referencing device defining a reference position of the actuating element, a plausibility device defining the plausibility position at a predetermined distance from the reference position, a control unit for controlling the actuator, said control unit having a counter to count the increments detected by the incremental sensor, a reference position detection device to detect the reference position of the actuating element, a plausibility position detection device to detect the plausibility position of the actuating element, a memory for saving counts of the incremental sensor and a target plausibility number of the increments that lie between the reference position and the plausibility position, and a comparator for comparing the target plausibility number with an actual plausibility number that is determined together with the referencing, and the referencing is saved as valid when the actual plausibility number deviates from the target plausibility number by less than a predetermined value.

The actuator can for example be an electric motor.

The plausibility device can be designed so that it changes in a predetermined manner the force to be applied by the actuator that is required to move the actuating element in the plausibility position.

The plausibility position detection device can for example detect the power consumption of the actuator.

The control unit of the device according to the invention can be designed such that the plausibility of the plausibility position may be checked by determining a variable having an influence on the actuation of an actuating element before and/or after the plausibility position is reached, a mutual relationship may be established between the determined quantities, and the plausibility position may be held to be plausible when a predetermined relationship is identified.

In a preferred embodiment, the plausibility device has a pickup component guided along a track that moves relative to the pickup component when the actuating element is moved, and the force required to move the track relative to the component in the plausibility position of the actuating element changes in a predetermined manner.

The pickup component may be advantageously elastically pretensioned toward the track, and the elastic pretension may change when the track moves relative to the pickup component.

In one embodiment of the device according to the invention, the actuator may actuate a linearly movable pickup element that swings the actuating element when it moves along a shaped surface of a swingable actuating element, and the plausibility device may be formed by a sudden change in slope of the shaped surface.

The referencing device can for example be formed by a stop.

In another embodiment, the referencing device may be formed by a referencing position of the shaped surface that the pickup element contacts when the clutch independently opens.

The invention that can be advantageously used wherever the position of an actuating element of a functional unit needs to be referenced will be explained in the following example of a motorized actuation device for a motor vehicle clutch.

BRIEF DESCRIPTION OF THE DRAWINGS

The figures show the following:

| FIG. 1 | A plan view of part of an actuation device of a clutch; |
| FIGS. 2 and 3 | Examples of tracks that are picked up by a pickup component; |
| FIG. 4 | A flowchart explaining the referencing; |
| FIG. 5 | Another exemplary embodiment of a track with a pickup element; |
| FIG. 6 | A half-length section of a double clutch; |
| FIG. 7 | A section from FIG. 6 to explain the actuation device; and |
| FIG. 8 | A force path characteristic to explain referencing according to the invention. |

DETAILED DESCRIPTION

Figure 1:
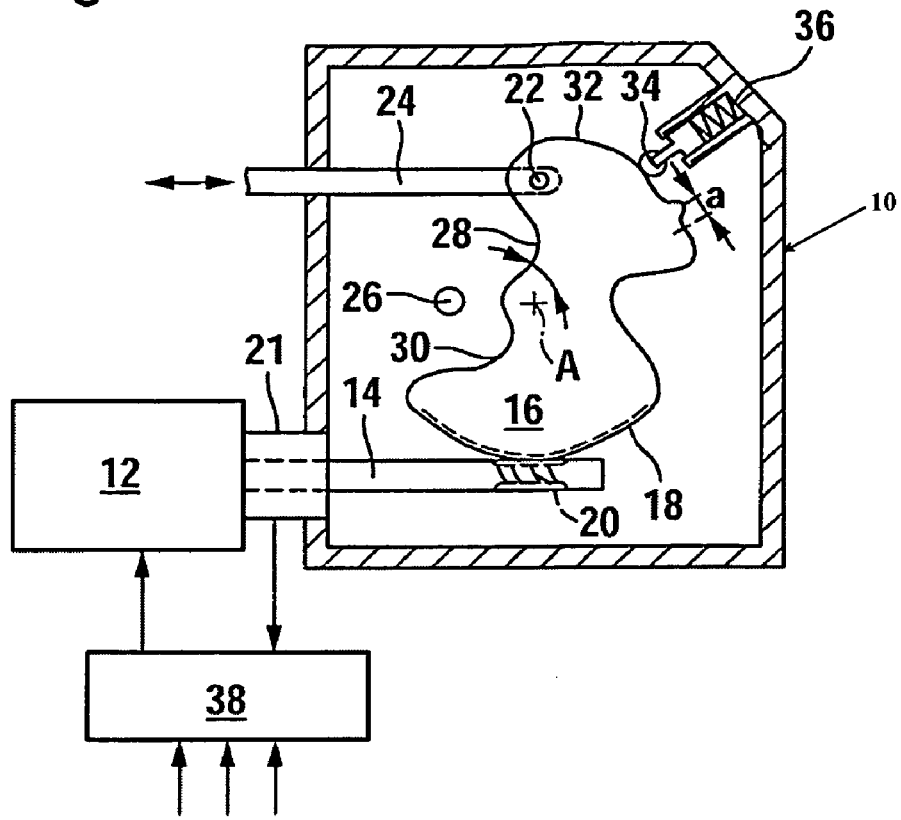

In FIG. 1, an electric motor 12 is mounted to the housing 10 of a clutch actuation unit, and the output shaft 14 of the electric motor rotatably drives a segment gear 16 rotatably mounted in the housing 10 on an axis A. The segment gear 16 has a peripheral area with teeth 18 that meshes with the helical teeth 20 of the output shaft 14. The rotary position of the output shaft 14 is detected by an incremental sensor 21.

An operation rod 24 is mounted in a bearing 22 to the segment gear 16, and the movement of the operation rod that can be a linear movement by means of the articulated subdivision of the operation rod is transferred to a release lever of a clutch with a generally known construction. The operation rod 24 can be directly connected to the clutch lever, or for example be connected to the clutch lever by means of a hydraulic transmission path. The rotatability of the segment gear 16 on axis A is limited by a stop 26 fixed to the housing that, in one or the other end position, contacts stop surfaces 28 and 30 of the segment gear 16. On its outer perimeter, the segment gear 16 has a profile that forms a track 32 for a pickup roller 34 that is guided to move linearly in a housing extension and is elastically pretensioned via a spring 36 against the track 32.

The electric motor 12 is controlled by an electronic control unit 38 that contains a microprocessor with associated memory devices and an input connected to the incremental sensor 21, as well as other inputs that are supplied with input variables such as the position of the gas pedal, the vehicle speed, the position of a gear, etc. that are relevant for operating the clutch. An output of the control unit 38 is connected to the electric motor 12 and controls its operation.

Figure 2:
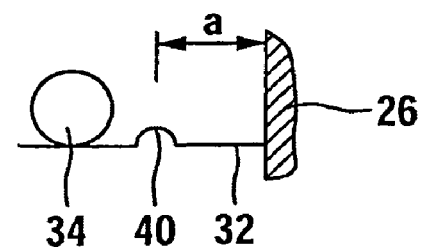
Figure 3:
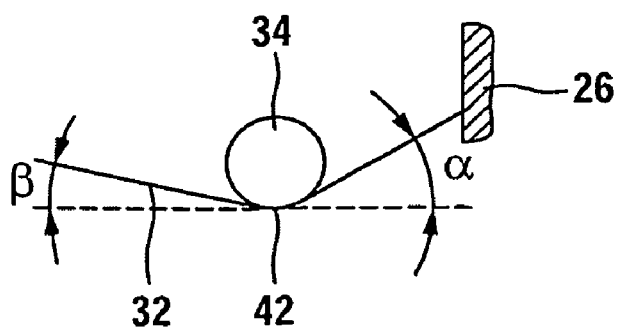

FIGS. 2 and 3 show two schematic representations of the contour of the track 32. In the embodiment in FIG. 2, the track 32 maintains a constant radial distance from rotary axis A of the segment gear 16, but is provided with a bump or a projection 40 that is at a predetermined distance "a" from the position at which the contact surface 28 of the segment gear 16 contacts the stop 26. In the embodiment in FIG. 3, the track 32 has a bottom position 42 at which the distance between the track 32 from the axis A is minimal. On both sides of the bottom position 42, the track 32 has a slope, and the slope toward the stop 26 has an angle $\alpha$ that is larger than the angle $\beta$ of the opposing slope.

Figure 4:
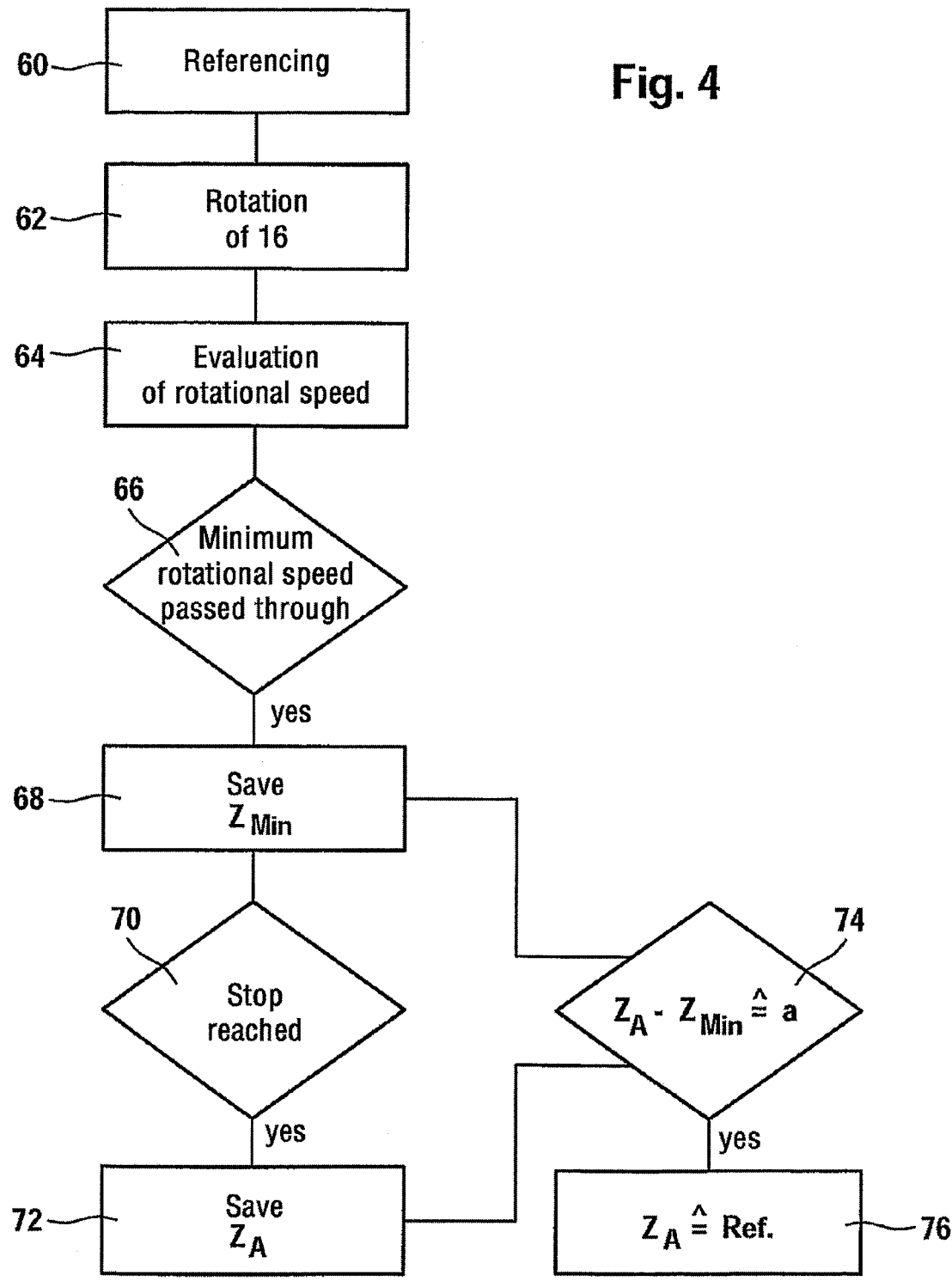

In the following, the functioning of the device will be explained with reference to the flowchart in FIG. 4.

Assuming that in step 60, a program is activated in the control unit 38 in which the position of the operation rod 24 or the clutch lever geometrically coupled to the operation rod is referenced. In step 62, the segment gear 16 is rotated counterclockwise, wherein the electric motor 12 is for example driven at a constant output so that the segment gear 16 rotates at a speed dependent on the counterforce of the clutch. In step 64, the rotational speed is evaluated, and in step 66, it is evaluated whether the rotational speed passes through a minimum which occurs when the pickup roller 34 passes over the projection 40. When a minimum is identified in step 66, that count is saved that a counter in the control unit 38 counting the increments of the incremental sensor 21 has when the minimum is passed through. The rotation of the segment gear 16 stops until it is determined in step 70 that the segment gear 16 is not rotating despite the force applied the electric motor 12 such that the stop 26 is reached. In step 72, the count $Z_A$ of the counter is saved that the counter has when the stop is reached. Step 74 checks if the difference between count $Z_A$ and $Z_{min}$ corresponds to distance "a". If this is the case, the referencing is held to be plausible or valid in step 76, and the count $Z_A$ is held to correspond to the reference position. When the difference between $Z_A$ and $Z_{min}$ does not corresponds to distance "a", the referencing is held to be implausible or wrong, and a corresponding display can be output. The components or functions for detecting the stop position accordingly form a reference position detecting device. The components or functions for determining the position of the pickup roller 34 traveling over the projection 40 form a plausibility position detection device. The number of increments between the plausibility position and the stop position is a target or actual plausibility count.

The distance "a" of the projection 40 from the stop position can differ due to manufacturing tolerances so that it is advantageous to teach distance "a" to the system after the clutch control system is mounted, for example at the end of the assembly line in a vehicle manufacturing plant.

The plausibility check occurs in a similar manner with the track shown in FIG. 3. The speed of the output shaft 14 then suddenly increases while the applied output of the electric motor 12 remains constant when the pickup roller 34 passes through the lowest position 42 and continues to move along the steeper ramp. Of course, the segment gear 16 reaches the stop 26 before the end of the steeper ramp is reached. In this case as well, the distance between the lowest position 42 and reaching the stop 26 is known beforehand. The movement of the pickup roller 34 along the steeper ramp can also be identified in that the electric motor 12 is operated at a constant speed, and the power consumption of electric motor 12 is measured. This power consumption lies within a predetermined range while the pickup roller 34 rolls on the steeper ramp, and the range lies between the output necessary for displacement when the segment gear 16 travels on a section of the track 32 with a constant radius, and the value that the output or voltage of the electric motor 12 assumes when the stop is reached. In a similar way, the output of the electric motor can be determined when the pickup roller travels on the flat ramp toward the stop 26 which is less than the power consumed by the electric motor while the pickup roller travels on a segment of the track 32 with a constant radius.

In the embodiment in FIG. 2 as well, the electric motor can be operated at a regulated, constant speed, and its power consumption can be determined when it travels over the projection 40.

The distance between the lowest position 42 and the stop is also previously known in the embodiment in FIG. 3 and is advantageously learned only after the assembly of the actuation device.

The invention can be altered in many ways. For example, the track or a shaped surface can be on the operation rod 24 or another component within the transmission of motion between the electric motor and clutch. Alternately, the pickup roller or the pickup element can be mounted on a component moved by the electric motor and can pick up a track fixed to the housing. There is a wide range of options, especially for the geometric design, for determining a specific location on the track that is at a predetermined distance from another specific location such as a stop. Instead of the stop position itself, the specific position on the track such as the lowest position 42 in FIG. 3 can be used as a reference position whose plausibility is then checked by identifying the stop 26 or another specific position on the track at a predetermined distance from the above-cited specific location.

Figure 5:
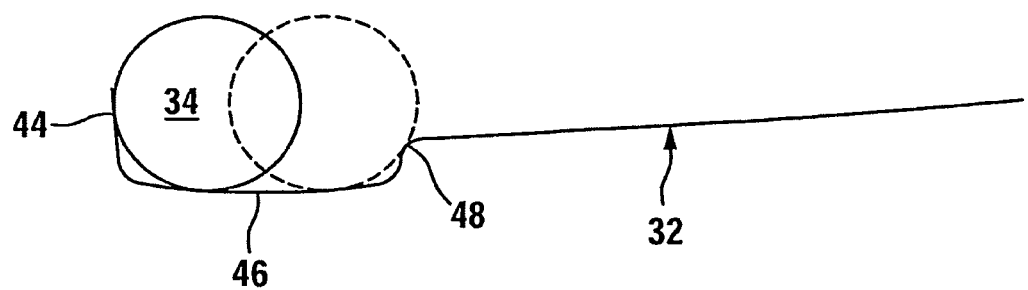

FIG. 5 shows another modified embodiment of a device according to the invention. A track is indicated by reference number 32 on which a pickup roller 34 rests. The track 32 has a stop 44 that limits the relative mobility between the pickup roller 34 and the track 32 in the "clutch open" direction. A stop at the opposite end of the track 32 for limiting the relative movement between the pickup roller 34 and track 32 in the "clutched closed" direction is not shown.

In the area before the stop 44, the track 32 has a recess 46 that transitions via a steep elevation or edge 48 into the remaining track. The pickup roller 34 can be directly mounted on a clutch lever or on a component between the clutch actuator and the clutch lever.

The plausibility of the position of the pickup roller 34 on the stop 44 can be checked by a small traveling motion of the clutch towards the closed position in which the pickup roller 34 contacts the edge 48 (drawn as a dashed line). This position of the pickup roller 34 can be detected by a sudden decrease in speed while the current applied to the actuator remains constant, or by a sudden increase in current or power consumption by the actuator while the actuator is regulated to maintain a constant speed. With this type of plausibility check, a slight movement of the clutch out of the assumed reference position into a position at which there is a significant but easily overcomeable resistance is sufficient to reliably determine the plausibility of the reference position. Of course, the plausibility can also be checked by detecting the sudden reduction of actuation force of the clutch before the stop 44 is reached; a flag is simultaneously set, and it is checked whether the stop 44 has been reached within the predetermined additional actuation path (width of the recess 46).

Since the plausibility check of the reference position that can be performed in a similar manner for the "clutched closed" reference position is only associated with a small actuation movement, it is easy to perform when, for example, the start position is lost due to a controller reset or error, or the actuator stops at an unanticipated position due to a mechanical defect or hits a stop.

Figure 6:
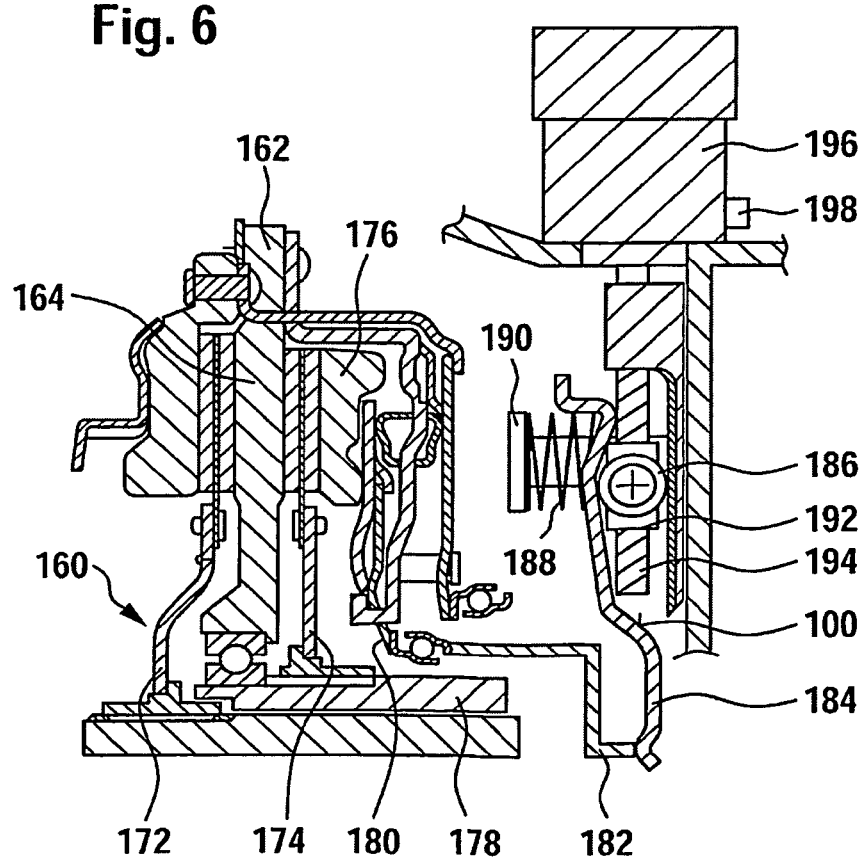

FIG. 6 shows a half lengthwise section of a double clutch 160 known per se whose housing 162 is fixedly connected to a crankshaft of an internal combustion engine. On the left of a baseplate 164 of the housing 162 is a first clutch disc 172 of a first clutch K1, and a clutch disc 174 of a second clutch K2 is on the right side of the baseplate 164.

In the following, only the actuation of the right-side clutch disc 174 will be explained. The left-side clutch disc 172 is actuated in a corresponding manner using a further actuation device.

The clutch disc 174 can be pressed against the base plate 164 using a pressure plate 176 to form a friction lock so that torque is transferable from the housing 162 via the clutch disc 174 to a second input shaft 178 of the double clutch transmission. To axially move the pressure plate 176, a plate-spring-like clutch lever 180 is used that is supported between the housing 162 and the pressure plate 176 and is shaped so that it independently moves the clutch into the open position.

To move the clutch lever 180 so that the pressure plate 176 presses the clutch disc 174 against the base plate 164, a transmission element 182 is provided that is supported against the clutch lever 180 on one side via a bearing, and at its other end, it contacts an operating lever 184.

The operating lever 184 contacts a roller 186 against which it is pressed by a spring 188 that abuts a permanently affixed stop 190.

The roller 186 is mounted on a spindle nut 192 whose thread engages with a spindle 194 that is rotated by an electric motor 196. To detect the rotary position of a component that rotates when the electric motor 196 is actuated, an increment sensor 198 is provided that is connected to an input of an electronic controller.

To actuate the clutch lever 180, the electric motor 196 rotates the spindle 194 along which the spindle nut 192 moves linearly which causes the roller 186 to move along a shaped surface of the operating lever 184 and to swing the operating lever corresponding to the slope that the shaped surface 100 has relative to the direction of movement of the roller 186.

The entire arrangement causes the plate-spring-like clutch lever 180 to move the transmission element 182 to the right from a closed clutch position due to its intrinsic force, wherein the idle torque of the electric motor 196 is overcome when the operating lever 184 is swung counterclockwise, and the roller 186 moves upward while rotating the spindle 194. The clutch is hence pushed by the electric motor into its closed position and independently moves into its open position when the electric motor shuts off.

Figure 7:
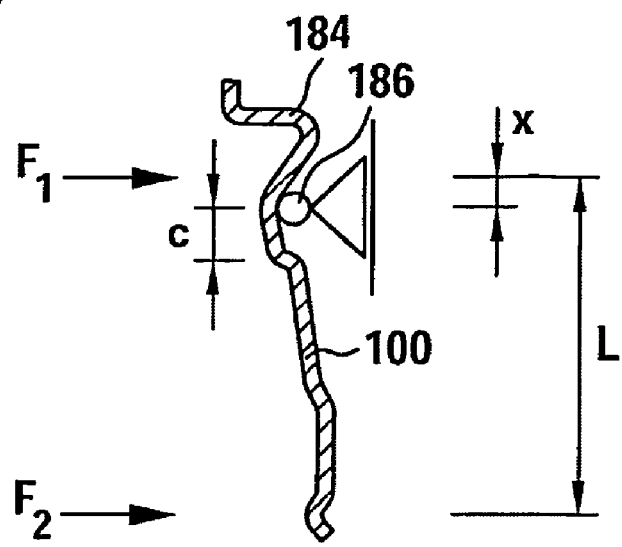

FIG. 7 illustrates the forces interacting with the operating lever 184 whose shape slightly differs from the lever shown in FIG. 6.

$F_1$ identifies the force that is exerted by the spring 188 on the operating lever 184. $F_2$ identifies the force of the transmission element 182 acting on the operating lever 184. L is the distance between the lines of action of the forces. X is the distance of the contact point between the roller 186 and the operating lever 184 from the line of action of force $F_1$.

The following relationship holds true:

$$F_2 \times (L-X) = F_1 \times X.$$

When the electric motor 196 is not powered, the system assumes the position shown in FIG. 7 under the force of the clutch lever 180.

Figure 8:
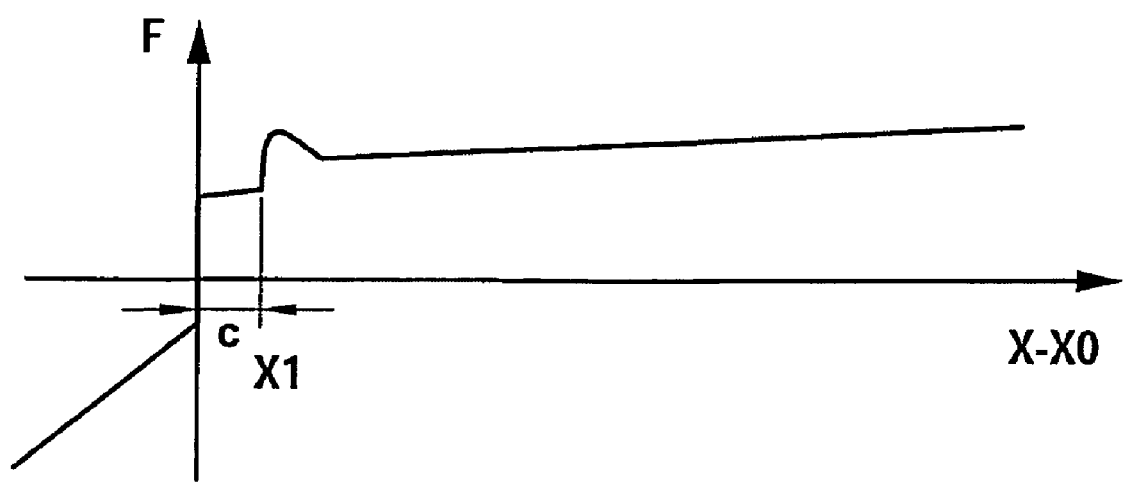

FIG. 8 shows the force to be applied by the electric motor 196 on the spindle nut 192 or the roller 186 as a function of (X−X0) wherein X0 is the position shown in FIG. 7 in which the clutch moves into an open position. This position is characterized in that the slope of the shaped surface 100 is reversed relative to the direction of motion. At the top in FIG. 7, i.e., beyond the open position of the clutch, the angle of inclination is comparatively large so that the negative force to overcome the open position rises strongly. Starting from open position X0 (shown in FIG. 7), the shaped surface 100 relative to the direction of movement of the roller 186 is initially only sloped slightly along section "c" and then transitions over a steep step into a similarly angled section.

FIG. 8 shows the following relationship of the forces:

When X=X0, the force F reverses its sign. To close the clutch, first a slightly increasing force is necessary as X increases that, after section c is overcome and the step is reached at X1, increases suddenly and then increases less strongly according to the slope. Depending on the design of the step at position X1, the force F can be more or less elevated after overcoming the step.

The following explains how the stepped design of the shaped surface 100 can be used for a reliable probability check of the referencing.

When the actuator 196 is powerless, the system independently moves to the position in FIG. 7 in which the roller 186 is at distance X0 from the line of action of force $F_1$. When the clutch is moved in the closed direction by the electric motor 196 to secure or check the plausibility of the referencing, the force has the characteristic in FIG. 8, i.e., it only slightly increases from an initial level while the roller 186 moves along section c and then increases suddenly. This sudden increase and the associated deflection of the roller 186 or section c are measured for example by measuring the power consumption of the electric motor or, when this is operated with constant power, by measuring the revolutions per unit time of the electric motor and the section c (using the incremental sensor 198). When section c lies within a plausible range, the referencing is held to be okay.

The attainment of plausibility position X1 can be further ensured by checking if the force/path curve in FIG. 8 actually follows the specified course. This can be done for example as follows:

While the spindle nut 192 is driven by the electric motor 196 at a constant regulated speed or revolutions per unit time, the (filtered) maximum value of the voltage ($U_{max}$) required by the electric motor is saved. The respective (filtered) position $XU_{max}$ is also saved at which this maximum motor voltage occurs.

The current maximum voltage ($U_{zw}$) is saved at a predetermined position a bit before reaching the step or position X1.

After the spindle nut 192 has moved sufficiently far beyond step X1, i.e., has safely moved past the plausibility position provided in the system, the ratio is formed between the two noted voltages ($U_{max}/U_{zw}$), wherein the value of $U_{max}$ corresponds to the peak of force F shown in FIG. 8. A target value for $U_{max}/U_{zw}$ is saved in the electronic controller. The attainment of plausibility position X1 is only held to be acceptable when the measured ratio $U_{max}/U_{zw}$ deviates less than a predetermined value from the saved target value.

The plausibility check of plausibility position X1 that must be successful to accept the referencing can also be performed in a different manner:

The voltage difference can be used instead of the ratio between the two voltages. The advantage of this is that the signal is largely independent of the base load.

Since the force/path characteristic is specified, the voltage gradient can also be evaluated that occurs when the step is being passed over.

Instead of evaluating the voltage applied to the electric motor, the voltage through the electric motor can also be detected. The advantage is that the imprecisely known electric resistance in the motor circuit is largely without influence.

When the current is evaluated, the ratio, difference or gradient of the measured currents or measured current characteristic can be evaluated.

In an altered embodiment, the actuation lever 184 in FIG. 7 above position X0 of the roller can be bent to be approximately vertical so that it forms a stop.

| Reference number list | |
|---|---|
| 10 | Housing |
| 12 | Electric motor |
| 14 | Output shaft |
| 16 | Segment gear |
| 18 | Teeth |
| 20 | Helical teeth |
| 21 | Increment sensor |
| 22 | Bearing |
| 24 | Operation rod |
| 26 | Stop |
| 28 | Stop surface |
| 30 | stop surface |
| 32 | Track |
| 34 | Pickup roller |
| 36 | Spring |
| 38 | Control unit |
| 40 | Projection |
| 42 | Lowest position |
| 44 | Stop (clutch open) |
| 46 | Recess |
| 48 | Edge |
| 60 | Referencing |
| 62 | Rotation |
| 64 | Evaluation |
| 66 | Evaluation of rotational speed |
| 68 | Saving |
| 70 | Stop reached |
| 72 | Saved counts |
| 74 | Check distance |
| 76 | Referencing |
| 100 | Shaped surface |
| 160 | Double clutch |
| 162 | Housing |
| 164 | Baseplate |
| 172 | Left clutch disk |
| 174 | Clutch disk |
| 176 | Pressure plate |
| 178 | Input shaft |
| 180 | Clutch lever |
| 182 | Transmission element |
| 184 | Operation lever |
| 186 | Roller |
| 188 | Spring |
| 190 | Stop |
| 192 | Spindle nut |
| 194 | Spindle |
| 196 | Electric motor |

-continued

Reference number list

| | |
|---|---|
| 198 | Increment sensor |
| A | Axis |
| a | Distance |
| α | Angle |
| β | Angle |
| $Z_\alpha$ | Count |
| $Z_{min}$ | Count |
| K1 | First clutch |
| K2 | Second clutch |

What is claimed is:

1. A method for referencing the position of an actuating element of a functional unit comprising:
   determining attainment of a reference position; and
   assessing the attainment of the reference position of the actuating element for plausibility by checking whether a variable applicable to the actuating element changes in a predetermined manner when the actuating element is at a specific distance from the reference position
   wherein the variable applicable to the actuating element is a speed of the actuating element when an actuation force of the actuating element remains constant.

2. The method as recited in claim 1 wherein the variable applicable to the actuating element has a first value when a plausibility position is reached, and wherein the checking comprises:
   determining a further value of the variable when the actuating element moves before and/or after the plausibility position is reached, establishing the relationship between the first value and the further value, and evaluating the plausibility position when the relationship meets specific criteria.

3. The method as recited in claim 1 wherein the functional unit is a clutch in a drivetrain of a motor vehicle.

4. The method as recited in claim 1 wherein the reference position is a stop.

5. A device for referencing the position of an actuating element of a functional unit, comprising:
   an actuator to move an actuating element;
   an incremental sensor detecting a change of the position of the actuating element;
   a referencing device defining a reference position of the actuating element;
   a plausibility device defining a plausibility position at a predetermined distance from the reference position;
   a control unit for controlling the actuator, the control unit having a counter to count increments detected by the incremental sensor;
   a reference position detection device to detect the reference position of the actuating element;
   a plausibility position detection device to detect the plausibility position of the actuating element;
   a memory for saving counts of the incremental sensor and a target plausibility number of the increments that lie between the reference position and the plausibility position; and
   a comparator for comparing the target plausibility number with an actual plausibility number that is determined together with a reference, and the reference only being saved as valid when the actual plausibility number deviates from the target plausibility number by less than a predetermined value.

6. The device as recited in claim 5 wherein the function unit is a clutch in a drivetrain of a motor vehicle.

7. The device as recited in claim 5 wherein the actuator is an electric motor.

8. The device as recited in claim 5 wherein the plausibility device is designed so that it changes, in a predetermined manner, a force to be applied by the actuator required to move the actuating element in the plausibility position.

9. The device as recited in claim 5 wherein the plausibility position detection device detects power consumption of the actuator.

10. The device as recited in claim 5 wherein the control unit can be designed such that the plausibility of the plausibility position is checked by determining an influential variable for the actuation of the actuating element before and/or after the plausibility position is reached, establishing a relationship between the determined quantities, and holding the plausibility position plausible when a predetermined relationship is identified.

11. The device as recited in claim 5 wherein the plausibility device has a pickup component guided along a track moving relative to the pickup component when the actuating element is moved, and a force required to move the track relative to the pickup component in the plausibility position of the actuating element changes in a predetermined mariner.

12. The device as recited in claim 11 wherein the pickup component is elastically pretensioned in relationship to the track, and the elastic pretension changing when the track moves relative to the pickup component.

13. The device as recited in claim 5 wherein the actuator actuates a linearly movable pickup element that swings the actuating element when the linearly movable pickup element moves along a shaped surface of a swingable actuating element, and the plausibility device being formed by a sudden change in slope of the shaped surface.

14. The device as recited in claim 13 wherein the referencing device is a referencing position of the shaped surface that the pickup element contacts when a clutch independently opens.

15. The device as recited in claim 5 wherein the referencing device is a stop.

* * * * *